United States Patent [19]
Lund

[11] Patent Number: 5,928,678
[45] Date of Patent: Jul. 27, 1999

[54] MASH FEED CONDITIONING APPARATUS

[75] Inventor: Robert Eugene Lund, Minneapolis, Minn.

[73] Assignee: AGP, L.P., Omaha, Nebr.

[21] Appl. No.: 07/576,360

[22] Filed: Aug. 31, 1990

[51] Int. Cl.$^6$ ................................................ B29B 13/00
[52] U.S. Cl. .............................. 425/207; 425/DIG. 230; 426/510; 426/511
[58] Field of Search .................................. 426/454, 448, 426/510, 511, 624; 264/349; 100/903, 905, 907, 908; 425/DIG. 230, 203, 207; 34/181, 182, 15, 33, 124, 125, 232, 229, 141; 95/261; 96/195, 196, 202, 217; 210/781; 127/1, 5, 6, 28, 23, 38, 65, 66, 71, 32, 29

[56] References Cited

U.S. PATENT DOCUMENTS

| | | | |
|---|---|---|---|
| Re. 26,257 | 8/1967 | Altman | 426/510 |
| 351,432 | 10/1886 | Free et al. | 34/181 |
| 396,621 | 1/1889 | Smith | 426/511 |
| 1,035,842 | 8/1912 | Anderson . | |
| 1,129,440 | 2/1915 | Anderson | 127/32 |
| 1,428,604 | 9/1922 | Merrill | 127/1 |
| 2,020,309 | 11/1935 | Grindrod | 426/511 |
| 2,021,899 | 11/1935 | Schneider | 426/511 |
| 2,148,016 | 2/1939 | Gale | 127/32 |
| 2,444,383 | 6/1948 | Stynler | 34/132 |
| 2,534,648 | 12/1950 | Wilbur | 426/510 |
| 2,700,940 | 2/1955 | Johnson . | |
| 2,707,836 | 5/1955 | Garrett | 34/124 |
| 2,887,718 | 5/1959 | Curran . | |

(List continued on next page.)

FOREIGN PATENT DOCUMENTS 57-56342  11/1982  Japan ..................................... 426/511

OTHER PUBLICATIONS

Holman, J.P., Heat Transfer, 7th ed., Mc–Graw Hill Publishing Co., NY, 1990, pp. 29–30.

Design and Construction of Pressure Relieving System by Sylvander and Katz: U. of Michigan Press 1948.

Shackelford et al., 1987, Experimental Two–Stage Pellet Mill Conditioner with Paddle Shaft Steam Injection, Poulstry Science vol. 63:1737–1743.

CPM Pacific Pelleting Handbook (published on or before Feb. 22, 1988 by CPM/Pacific Limited, Division of Ingersoll–Rand).

The Pellet Mill Operators Manual (1982, American Feed Manufacturers Association, Inc.).

The Pelleting Processs (copyright 1982, Coppers Co., Inc.).

The Original Vertical Conditioner™ brochure (copyright 1986 VE Corporation, Form 01–2 1 M 386).

The Original Vertical Conditioner™ brochure (copyright 1986 VE Corporation, Form 01–1 M 386).

The Master/Slave Controls brochure, copyright 1986 VE Corporation 6140 1M 186.

The Vaporator® Direct–Fired STeam Generator brochure, copyright 1986® VE Corporation/6133 3M/186.

Walter, 1987, The Impact of Mechan–hydrothermal Extrusion Cooking, Feed Magazine, pp. 47–50.

Landers Machine drawing, copyright Jun. 1976, Landers Company, Fort Worth, Texas.

*Primary Examiner*—Patrick Ryan
*Assistant Examiner*—Joseph Leyson
*Attorney, Agent, or Firm*—Kent A. Herink, Esq.; Daniel A. Rosenberg, Esq.; Davis, Brown Law Firm

[57] ABSTRACT

A mash feed treatment system including a mash feed conditioning apparatus connected in series with a roller mill and a pellet mill. The mash feed conditioning apparatus includes a housing having an interior and an inlet and outlet, a shaft mounted within the interior of the housing having an internal cavity, and mechanisms for rotating the shaft to convey feed within the interior and for introducing steam into the interior via the cavity of the shaft. The shaft and the housing preferably include pressure containment mechanisms for maintaining superatmospheric pressures within the cavity and the interior respectively.

10 Claims, 9 Drawing Sheet

U.S. PATENT DOCUMENTS

| | | | |
|---|---|---|---|
| 3,110,060 | 11/1963 | Rensert | 425/203 |
| 3,119,719 | 1/1964 | Kott et al. | 127/32 |
| 3,230,902 | 1/1966 | Grimm et al. . | |
| 3,252,406 | 5/1966 | Altman | 426/510 |
| 3,303,578 | 2/1967 | Rockwell et al. | 34/182 |
| 3,308,554 | 3/1967 | Overton | 34/124 |
| 3,336,137 | 8/1967 | Hickey | 426/510 |
| 3,357,834 | 12/1967 | Hickey et al. | 426/453 |
| 3,416,902 | 12/1968 | Anderson et al. . | |
| 3,417,485 | 12/1968 | Saxon | 34/182 |
| 3,426,839 | 2/1969 | Overton | 34/124 |
| 3,482,986 | 12/1969 | Hessen et al. . | |
| 3,492,741 | 2/1970 | Witworth | 34/124 |
| 3,528,815 | 9/1970 | Trotter | 426/510 |
| 3,574,632 | 4/1971 | Lanz . | |
| 3,881,024 | 4/1975 | Pahoundis, Sr. et al. . | |
| 3,923,097 | 12/1975 | Hovad | 34/124 |
| 3,932,736 | 1/1976 | Zarow et al. | 425/DIG. 230 |
| 3,993,796 | 11/1976 | Steinke . | |
| 4,001,452 | 1/1977 | Williams . | |
| 4,050,510 | 9/1977 | Theysohn | 34/124 |
| 4,167,584 | 9/1979 | Nelson . | |
| 4,212,890 | 7/1980 | Tiefenbacher et al. . | |
| 4,219,586 | 8/1980 | Parks, Jr. . | |
| 4,340,937 | 7/1982 | Volk, Jr. . | |
| 4,413,016 | 11/1983 | Skoch et al. . | |
| 4,446,163 | 5/1984 | Galle et al. . | |
| 4,476,637 | 10/1984 | Justus et al. | 34/124 |
| 4,510,104 | 4/1985 | Weaver et al. . | |
| 4,511,321 | 4/1985 | Howard . | |
| 4,559,980 | 12/1985 | Giusti | 426/510 |
| 4,569,299 | 2/1986 | Vogel . | |
| 4,646,540 | 3/1987 | Blackwood et al. | 34/124 |
| 4,667,418 | 5/1987 | White . | |
| 4,669,966 | 6/1987 | Dueren . | |
| 4,671,757 | 6/1987 | Volk, Jr. | 425/144 |
| 4,680,189 | 7/1987 | Schumacher et al. . | |
| 4,686,779 | 8/1987 | Wyatt et al. | 34/168 |
| 4,698,225 | 10/1987 | Morrison . | |
| 4,700,310 | 10/1987 | Volk, Jr. . | |
| 4,704,804 | 11/1987 | Wyatt et al. | 34/15 |
| 4,711,622 | 12/1987 | Schaffner | 425/DIG. 230 |
| 4,721,448 | 1/1988 | Irish et al. | 425/DIG. 230 |
| 4,742,463 | 5/1988 | Volk, Jr. . | |
| 4,767,301 | 8/1988 | Volk, Jr. | 425/DIG. 230 |
| 4,789,321 | 12/1988 | Dingus . | |
| 4,812,324 | 3/1989 | Pierik . | |
| 4,882,105 | 11/1989 | Volk, Jr. | 425/454 |
| 4,929,163 | 5/1990 | Volk, Jr. | 425/DIG. 230 |
| 4,983,343 | 1/1991 | Lund | 266/142 |
| 4,994,286 | 2/1991 | Greer . | |
| 5,051,269 | 9/1991 | Noreille et al. | 426/453 |
| 5,415,884 | 5/1995 | Manser et al. | 426/510 s |

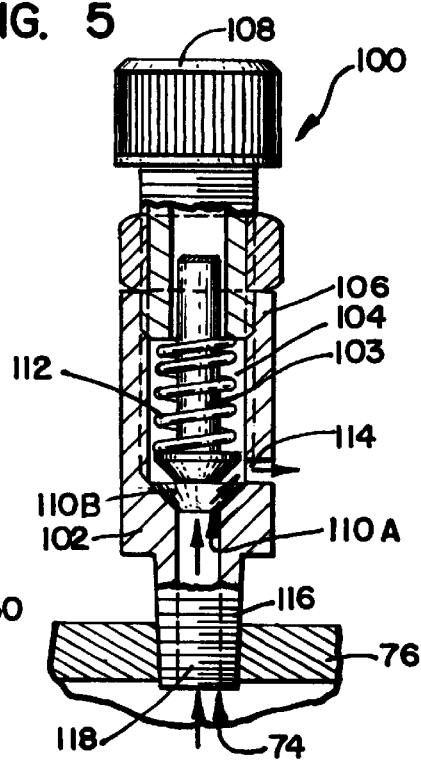
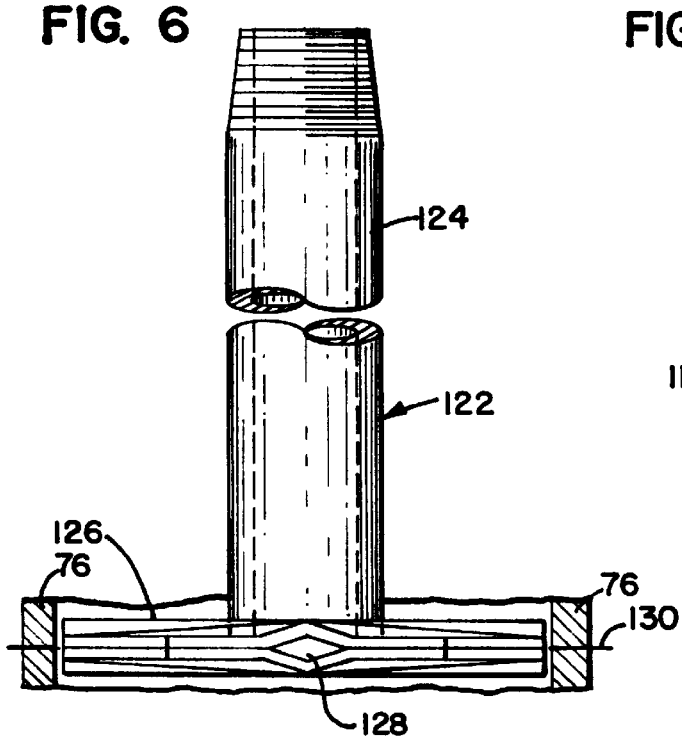
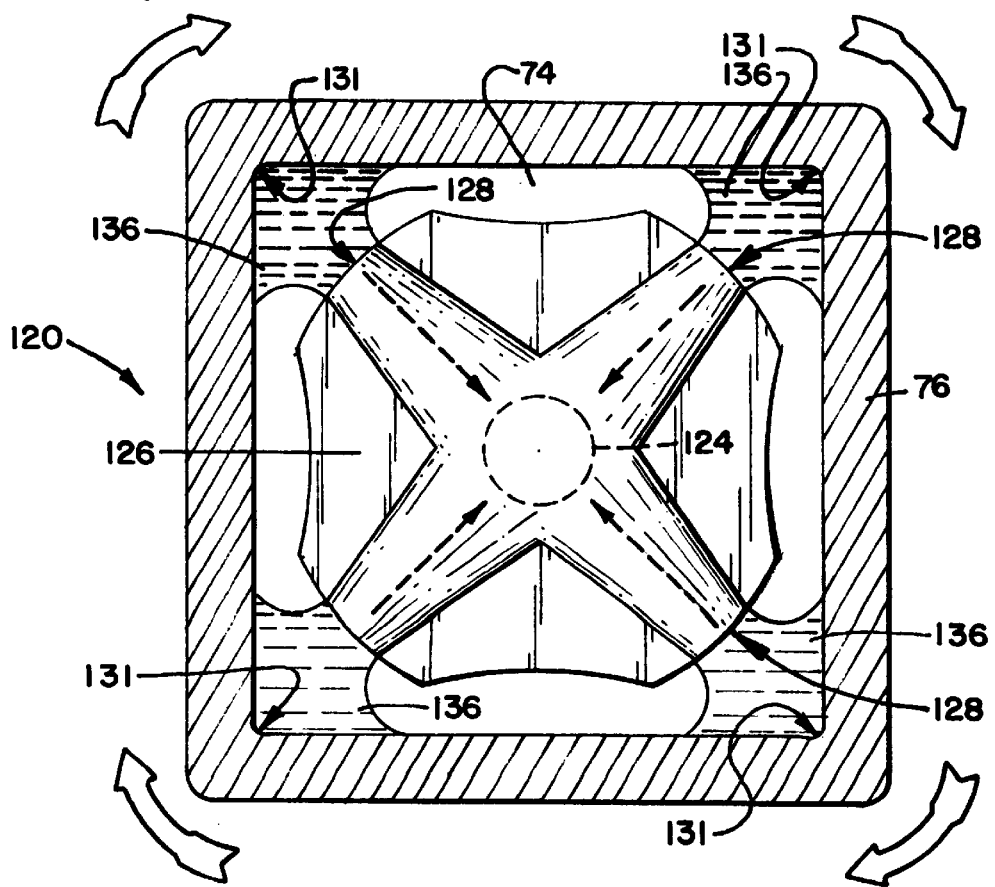

MASH FEED CONDITIONING APPARATUS

FIELD OF THE INVENTION

The present invention relates to a mash feed conditioning apparatus for use in conditioning mash feed such that the conditioned mash feed can be converted to pelletized feed products and a mash feed conditioning system including the inventive conditioning apparatus, a roller mill for further processing of the conditioned feed, and a pellet mill which pellets the feed. More particularly, the present invention relates to a mash feed conditioning apparatus which utilizes a hollow, steam pressurized shaft, contained within a pressurized housing, for conditioning mash feed for pelleting. The hollow shaft includes a moisture removal mechanism for removing moisture which condenses on the innersurfaces of the shaft walls. The present invention also provides methods of manufacturing feed pellets having a high degree of starch gelatinization and compression hardness.

BACKGROUND OF THE INVENTION

Mash feed conditioning apparatuses, roller mills and pellet mills, as well as processes for pelleting particulate feed material using such devices individually, are old in the art. The processing of particulate feed material is, nevertheless, quite complex. In order to process feed efficiently, it is important to take many factors into account during the design and operation of a pelleting system. Of critical importance to such design and operation is the configuration of the mash feed conditioning apparatus employed.

Typically, a mash feed conditioning apparatus employs heat, which can be supplied in various forms, to heat condition or "cook" the mash feed prior to pelleting. Often, steam is used to transfer heat and moisture to the mesh feed during conditioning operations. The utilization of steam to transfer heat, however, presents several problems. Of primary concern is the tendency of steam conditioning to impart too much moisture to the feed being conditioned. When the mash feed becomes too moist, it often takes on a tacky or sticky consistency which is nonconducive to the conditioning process. For example, "sticky" feed adheres to and clogs the internal assemblies of the conditioning apparatus, the roller mill and the pellet mill. Thus, when "sticky" feeds are pelletized, most pelleting systems must be stopped frequently for cleaning and unclogging. This results in a lowered throughput due to increased "down time" during normal pelleting operations.

In an attempt to reduce the amount of moisture introduced into the feed, conditioning apparatus operators often reduce the residence time of the mash feed within the conditioning apparatus or reduce the amount of steam introduced. However, this strategy results in a reduction in the heat transferred to this mash feed and, ultimately, in insufficiently conditioned feed. It is well appreciated in the art that to make a better quality pellet, the temperature of the mash feed must be elevated as high as possible without burning or drying the feed prior to pelleting the feed. Furthermore, lack of sufficient heat conditioning reduces the degree of gelatinization of starch within the feed and, accordingly, the nutritional value of the feed, particularly in respect to new born monogastric animals such as baby pigs which generally have insufficient digestive enzyme producing capability to completely digest ungelatinized starch.

Another strategy involves maintaining the interior of a conditioning apparatus at superatmospheric pressures. However, direct contact between the steam and the mash feed, and the steam and the apparatus walls without prior adjustment to the lower pressure in the superatmospheric conditioning apparatus still results in the transfer of a significant amount of condensed moisture to the feed in the apparatus. For instance, Williams (U.S. Pat. No. 4,001,452) discloses a conditioning apparatus wherein the mash feed is conditioned by steam maintained at superatmospheric pressure within the apparatus. However, as noted above, this system disadvantageously exposes the mash feed directly to the steam being introduced therein. Similarly, White (U.S. Pat. No. 4,667,418), which discloses an anaerobic conditioning system utilizing high pressure steam which also exposes mash feed directly to the steam. Thus, mash feed being conditioned in either of the above apparatuses or systems will continue to present the difficulties associated with the overmoist feed discussed above.

It is clear that there has existed a long and unfilled need in the prior art for a mash feed conditioning apparatus which can be used to condition mash feed with an optimal amount of steam heat without introducing too much moisture to the feed to allow for effective pellet processing of the conditional feed. In particular, a need exists for a mash feed conditioner which optimizes the amount of heat transferred to the feed with every respective unit of moisture. Furthermore, a need exists for a method of conditioning mash feed with steam without imparting excess moisture to the feed being conditioned. The present invention solves these and other problems associated with the prior art.

SUMMARY OF THE INVENTION

Accordingly, a mash feed conditioning apparatus in accordance with the principles of the present invention is provided. The mash feed conditioning apparatus preferably includes a housing in which mash feed is heated with steam which is passed through a hollow shaft preferably mounted coaxially with the housing. The hollow shaft includes steam introduction means which first deliver high pressure steam to an internal cavity in the hollow shaft. Thereafter, steam is delivered through steam outlet means to an interior of the housing for conditioning mash feed contained therein. In a preferred embodiment, both the housing and hollow shaft are capable of being maintained at superatmospheric pressures. In most preferred embodiments, the shaft includes moisture removal means for removing condensed moisture from the internal cavity of the hollow shaft.

The housing according to the present invention has a mash feed inlet and mash feed outlet for respectively introducing mash feed into, and passing conditioned mash feed out of, an interior of the housing. Individual rotary air locks are connected with each of the respective mash feed inlets and outlets, so that superatmospheric pressures can be maintained within the interior of the housing, while allowing mash feed to be introduced into and passed out of the interior. In addition, the walls of the housing, or portions thereof, are preferably at least partially composed of an insulating material, preferably such as ultra high molecular weight polyethylene or any other suitable material, which significantly reduces the condensation of moisture from the steam upon the housing walls because of its reduced coefficient of specific heat as compared to most metal materials generally used to make walls in prior art conditioning apparatus housing devices.

The hollow shaft also includes conveying means, preferably including a series or a plurality of series of extensions or picks helically mounted on the rotatable shaft, for conveying mash feed from an input end of the housing to an output end. In operation, one end of the shaft is connected to rotation means which rotate or drive the shaft such that mash feed is conveyed from one end of the interior of the housing to the other. In addition, the hollow shaft preferably includes moisture removal means for removing condensed moisture resulting from the condensation of steam introduced into the internal cavity of the hollow shaft.

The problems described above relating to excess moisture are generally believed to result at least in part from the direct application of steam to the mash feed to be conditioned. In particular, steam which is fed directly into the interior of a conditioning apparatus under pressure undergoes an immediate pressure drop when it is released into conditioning apparatus. This pressure drop is believed to result in a loss of latent heat which causes a portion of the moisture in the steam to condense. In addition, when the steam comes into contact with the inner walls of the conditioning apparatus, which will generally have a higher specific heat than the air environment within the conditioning apparatus, a further transfer of latent heat occurs, resulting in the condensation of additional moisture upon the walls of the apparatus. As a result, most of this excess moisture is transferred to the mash feed being conditioned within the apparatus without the concurrent transfer of heat.

The mash feed conditioning apparatus according to the present invention provides many advantages over the prior art feed conditioners. The ability of the hollow shaft and housing or housing means to maintain superatmospheric pressures significantly increases the amount of heat which can be carried, and ultimately transferred to the feed, by steam introduced into the shaft and into the housing via the shaft cavity. In addition, the moisture removal mechanism reduces the amount of condensed or cooled moisture associated with the steam, thereby maximizing the amount of heat associated with each unit of moisture and providing drier steam. This allows operators to use much more steam and transfer much more heat to the feed, than is otherwise possible given the practical limit presented by the difficulty of processing mash feed with a high external moisture content.

Therefore, the present conditioning apparatus facilitates the utilization of a very high temperature, low moisture steam to introduce heat into mash feed in order to condition the feed. Steam introduced into the apparatus first contacts the cavity walls of the hollow shaft before passing through steam outlet means into the interior of the housing to condition mash feed therein. Thus, much of the initial latent heat loss resulting from the initial introduction of steam into hollow shaft occurs before the steam leaves the hollow shaft. The condensate on the cavity walls, which results from this heat loss, is not transferred to the mash feed being conditioned within the interior of the housing because it is removed from the shaft before the steam leaves the shaft and enters the interior. Moisture removal means within the cavity of the shaft continually draw the cooler, condensed moisture or condensate out of the cavity, leaving only the relatively hot dry steam for introduction into the interior of the conditioning apparatus. This enables the user to introduce more heat per unit of moisture introduced into the feed. Use of this drier, hotter steam also allows the user to introduce moisture into the feed more gradually which permits greater internal absorption of moisture, and a gradual increase in the amount of moisture which is believed to be internalized or bound into the feed. This gradual increase in internal moisture content allows the specific heat of the feed to gradually rise from about 0.46 to about 0.52 or more, which ultimately enables the feed to absorb heat more readily than if it had a lower bound moisture content and a lower specific heat.

Thus, use of drier steam is also important as a means of limiting the amount of external moisture which condenses on the outer surfaces of the feed and makes the feed too wet to be effectively processed, at the same time that it also promotes the absorption of moisture to enhance the ability of the feed to absorb more heat. Although, more heat has generally been desirable to obtain further conditioning, prior steam processing operations have had to limit steam introduction, because too much external moisture in the feed made further processing extremely problematic.

Use of the preferred insulating material, comprising at least a portion of the walls of the housing is also believed to significantly reduce moisture condensation on the housing walls as compared to walls which would have generally higher coefficients of specific heat.

Therefore, the total amount of moisture imparted to the mash feed being conditioned within the interior of the present housing is significantly reduced. More importantly, for every unit of moisture being introduced into the mash feed, a greater amount of heat is transferred. While some moisture is necessary, it is heat which drives the gelatinization of the starch and the general plasticization of the feed which is so critical to effective feed compression during subsequent pellet processing.

In another aspect of the present invention, a mash feed conditioning system is provided comprising a mash feed conditioning apparatus as described above connected in series, with a compression roller mill, mounted proximate the mash feed outlet of the conditioning apparatus, and then a pellet mill. The roller mill will preferably have opposing differential rolls which compress and shear the conditioned feed after it leaves the conditioning apparatus. The shearing action of the differential rolls upon the conditioned mash feed cracks the starch kernels in the mash feed at the same time that heat and moisture are driven into the feed, thereby resulting in further absorption of moisture and a higher degree of gelatinization than would otherwise occur. In the process, the moisture which is driven into the feed where it is believed to become bound moisture as a result of gelatinization of the starch. As a result, less moisture is available to render the consistency of the resulting conditioned feed tacky or sticky. Additional moisture flashes off of the feed as steam, as the feed passes through the roller mill.

The present invention also provides a mash feed pelleting system, including a mash feed conditioning apparatus and roller mill, as described above, in serial connection with a pellet mill. The pellet mill includes a die and roller assembly mechanism which forces the conditioned mash feed through extrusion passages in the die and cuts the compressed mash feed into feed pellets with cutting members mounted proximate the outer surface of the die.

In yet a further aspect, the present invention provides a method of conditioning mash feed to be pelleted in a pellet mill comprising the steps of providing a mash feed conditioning apparatus as described above, imputing raw mash feed into the interior of the housing of the conditioning apparatus, introducing steam into the cavity of the hollow shaft, and thereafter, through steam outlet means of the shaft, into the interior of the housing to condition mash feed therein. Preferably, the hollow shaft includes moisture removal means for removing moisture from the cavity thereof and the step of introducing steam into the cavity of the shaft and into the interior of the housing includes removing condensed moisture from the cavity of the shaft.

Utilization of a mash feed conditioning apparatus according to the present invention allows the delivery of a high pressure, low moisture steam at superatmospheric pressures in order to efficiently transfer heat at higher temperatures to mash feed being conditioned in the conditioning apparatus. Thus, mash feed to be pelleted can be conditioned at an optimum temperature, and the moisture content of the mash feed can be minimized prior to its introduction into the roller mill or the pellet mill of the present invention.

The optimal conditions accorded by the method of the present invention result in a conditioned mash feed which is drier externally, more highly gelatinized, and more easily moldable (or plastic) than other conditioned feeds. These characteristics in turn contribute to efficiencies experienced during operation of the mash feed pelleting system of the present invention. For example, a drier, more plastic conditioned feed will allow for greater friction between the rollers and the feed during operation of the pellet mill, or, as commonly stated within the art, the feed will have a better "bite" when passing through the pellet mill to form pellets. The conditioned feed is also quite hot when it reaches the pellet mill, so hot that the conditioned mash feed can actually cool off when it passes through the extrusion passages of the extrusion die by transferring heat to the die. This cooling can have the effect of shrinking the outside diameter of the extruded mash feed just enough to lower or even eliminate the friction of the feed passing through on the die, thereby, reducing the force required to push it through. In fact, if the temperature of the mash feed being processed by the pellet mill is greater than about 140° F., preferably about 150° F., or more preferably about 160° F., or more the friction between the feed and the extrusion passages of the extrusion die can be reduced to zero or even show a slightly negative value. It is believed that this finding may revolutionize feed pelleting operations, allowing for pellet throughputs of two, three or even four times the throughputs normally associated with prior art feed pelleting operations. Processing of such conditioned feed can, therefore, increase the overall rate of production and efficiency of the pelleting system.

In a further aspect, the present invention provides a feed pellet manufactured by the method of the present invention. The pellet obtained by this process displays a high degree of gelatinization. Thus, the pellet delivered by the present process is nutritionally superior to other commercially available pelleted feeds, especially for newborn animals such as suckling pigs and other newborns having a reduced compliment of degradative digestive enzymes. Such pellets can also contain a lowered available moisture content which prevents premature spoilage of the feed pellets. The hardness of such pellets is also subject to significant increase over the hardness generally associated with feed pellets of various kinds.

It will be appreciated that gelatinization of starch is the hydration of starch molecules. This chemical reaction is governed by the parameters of time, pressure, moisture, and temperature. The degree of gelatinization is determined by these parameters. The gelatinization of starch in the mash feed, therefore, will be determined by the variation of these parameters which will also affect the quality of the ultimate pellets which are produced. To optimize the degree and consistency of gelatinization during the pelleting process, is believed that the ideal control for the parameters mentioned above would be to gelatinize the starch in the shortest time possible at the highest pressure, highest temperature, and lowest moisture content possible, although moisture content is not critical if it does not exceed certain empirical parameters set by the practical considerations related to processing efficiency, shelf stability, and the like. It is especially important to limit the moisture on the exterior surfaces of the feed particles in order to avoid reducing the "bite" of the feed when it is delivered into the pellet mill. In addition, to improving the value of the feed to domesticated animals, especially newborns, it is believed that improved gelatinization of the feed stock can result in harder, more durable pellets which resist breaking and chipping.

In the present system, steam is used to elevate the mash feed temperature in the conditioning apparatus. It will be appreciated that the specific heat of dry mash feed is generally about 0.46 calories per gram per degree of Centigrade change at 10.5% moisture. Because specific heat is also a function of the moisture in the mash feed, it is noted that the specific heat of the feed will increase as it absorbs moisture. It is important, however, to do as much as possible to prevent the moisture from condensing on the outer surfaces of the feed particles. Instead, it is believed to be desirable to allow the moisture to be absorbed into the feed particles, thereby transferring as much heat as possible to the feed while limiting the amount of condensate on the external surfaces of the feed particles. This can be accomplished by distributing the input points for steam along the length of shaft which runs through the length of the housing, and by using pressure relief valves to control the steam released into the interior of the housing such that the steam pressure in the shaft cavity and in the interior of the housing can gradually be increased to pressures in excess of 25, 40 and even 90 psi and thereby, eliminating or significantly minimizing any pressure drops between the boiler and the interior of the housing.

Furthermore, if the innersurface of the conditioning apparatus, or significant portions thereof, are made of an insulating material, preferably a non-metallic material suitable for repeated exposure to the temperatures associated with steam at pressures of 20 pounds per square inch (psi) and having a specific heat of at least about 0.3, preferably about 0.3–0.8 calories per gram per degree Centigrade change (or BTU per pound per degree Fahrenheit change), then condensation on the inner walls of the conditioning apparatus can also be reduced because the speed at which the material of this innersurface will absorb or transfer heat will be reduced as compared to the normal metallic materials which are generally used to form the innersurface of such prior art conditioning chambers. This will have the effect of reducing moisture condensation by slowing the transfer of heat away from the gaseous moisture in the steam. Therefore, the steam will retain more heat and less condensate will form within the conditioner housing. Preferably, a good portion, if not all, of the innersurface of the conditioning apparatus will be made of a man made material having a specific heat of about 0.33–0.78. Preferred embodiments of these portions of the innersurface of the conditioning apparatus can be made of materials such as polypropylene, polyvinyl butyryl, polyvinylidene fluoride (PVDS), polyethylene, ultra-high molecular weight (UHMW) polyethylene, preferably type III high density UHMW polyethylene having a specific heat of from about 0.46–0.55 BTU per pound per degree F change, nylon, preferably nylon 6 having a specific heat of 0.4 or nylon 11 having a specific heat of 0.58, or the like. When such an insulating material is used to form a portion of the innersurface of the conditioning chamber, the steam is less likely to condense on such a surface because the specific heat is such that the heat of the steam is not transferred as quickly as it might otherwise be transferred were it to come into contact with a metal material or the like. In a preferred embodiments, the non-metallic material which forms the innersurface, or a portion thereof, of the conditioning apparatus will have as low a specific heat as is functionally possible while still providing a suitable structural surface which is acceptable for the intended purpose.

Accordingly, in yet another aspect, the present invention provides a conditioner having an innersurface wherein at least a portion of the innersurface is made of non-metallic materials suitable for repeated exposure to temperatures of at least about 250° F., most preferably to the temperature of steam at 20 psi, and having a specific heat of at least about 0.3 calories per gram per degree Centigrade change.

In a further aspect of the present invention, the respective rolls of the roller mill are set quite close together, preferably 0.05–0.25, more preferably about 0.1 inch apart. After passing through the roller mill, the conditioned mash feed is preferably pelletized using a pellet mill having air relief pressure rollers in accordance with those disclosed in U.S. patent application Ser. No. 240,966 which was filed on Sep. 6, 1988, which issued as U.S. Pat. No. 4,983,343, on Jan. 8, 1991, and is incorporated by reference herein. Preferred embodiments of such air relief pressure rollers, die roller assemblies, and pellet mills including same as disclosed in the above-mentioned U.S. Patent Application.

As the mash feed passes through the roller mill, significant pressure is placed on the moist mash feed and a significant amount of moisture is driven into the feed which in turn carries with it a further transfer of heat, which results in further gelatinization of starch. In addition, when the feed emerges from the roller mill, a significant amount of external moisture is removed because the steam will "flash off" when the feed emerges from the roller mill. In addition, further steam will flash off when the feed passes through the extrusion die. The air relief pressure rollers in the pellet mill help to relieve the mash feed of entrained air and permit additional steam to flash off as the feed is compressed between the pressure rollers and the extrusion die. At each point at which steam is able to flash off, the feed is cooled because the removal of moisture allows for the transfer of additional heat away from the feed. As the feed cools it also solidifies and contracts. When the feed stock is extruded through the extrusion die, the traditional temperature rise of the feed due to friction between the feed and the extrusion passage of the extrusion die can generally be held to as low as 10° F. In preferred operations this rise in temperature can be lowered and even eliminated, and under ideal conditions, a temperature drop of as great as 8° F. can be achieved. That is to say, that as the feed passes through the extrusion die, there is little or no friction, perhaps even what theoretically is a negative friction can be observed, between the feed and the die passages or extrusion passages. In fact, the temperature of the feed can drop as heat is transferred from the feed to the die. The feed can reach a moisture deficiency state for a given temperature and pressure of the feed entering the orifice of the die passage. It is believed that this drop in temperature, resulting from the transfer of heat from the feed to the die as the feed passes through the respective die passages, is in fact a major factor in lowering the amount of friction between the feed and the extrusion passages of the extrusion die because shrinkage which is believed to result from cooling and solidification of the plastic conditioned feed as it is extruded. This drop in friction between the feed and the restriction passages of the extrusion die can result in an impressive decrease in milling horse power per ton of feed throughput. It will be appreciated that the present disclosure represents a tremendous advance in processing. The efficiencies which are achievable with the anticipated development of the present invention are believed to be very likely to result in the displacement of prior art methods of feed processing.

These and various other advantages and features of novelty which characterize the present invention are pointed out with particularity in the claims annexed hereto and forming a part hereof. However, for a better understanding of the invention, its advantages and objects attained by its use, reference should be made to the drawings which form a further part hereof and to the accompanying descriptive matter in which there is illustrated and described preferred embodiments of the present invention.

BRIEF DESCRIPTION OF THE DRAWINGS

Referring now to the drawings in which like reference numbers refer to corresponding parts throughout.

FIG. 5 is an enlarged partial cross-sectional view of a spring-loaded pressure relief valve shown in FIG. 3;

FIG. 6 is an enlarged side view of the moisture removal device shown in phantom in FIGS. 2–3;

FIG. 7 is an enlarged partial sectioned end view of the moisture removal mechanism removing condensed moisture from the shaft cavity as seen generally from the line 130 of FIG. 6;

DETAILED DESCRIPTION OF A PREFERRED EMBODIMENT

Figure 1:
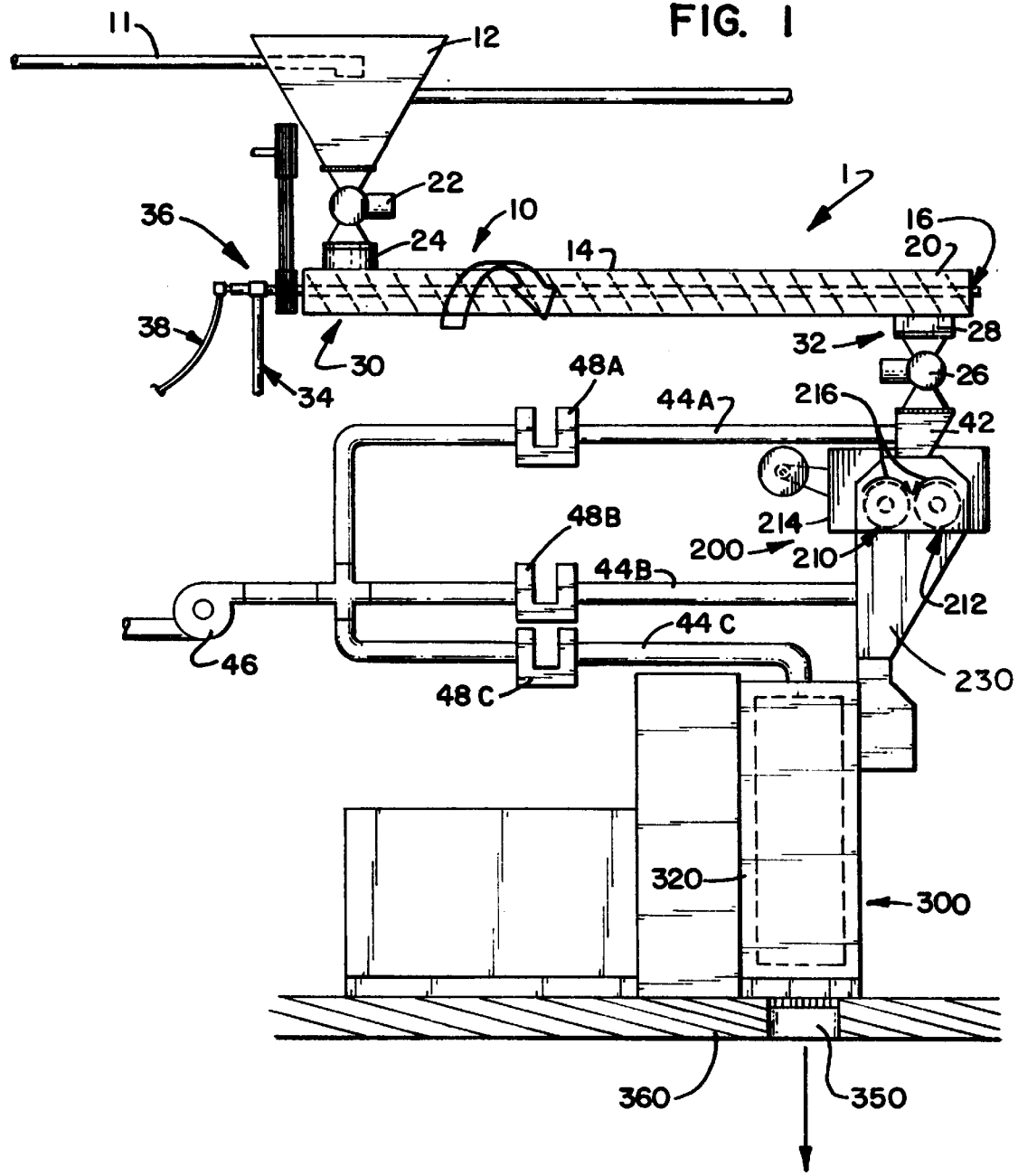
FIG. 1 is a schematic illustration of a mash feed pelleting system employing a mash feed conditioning apparatus in accordance with the present invention.

Referring now to the drawings, FIG. 1 is a schematic illustration of a mash feed pelleting system 1, including a mash feed conditioning apparatus 10, a roller mill 200 and a pellet mill 300 according to a preferred embodiment of the present invention. Mixed, raw mash feed is fed into the conditioning apparatus or conditioner 10 by way of a feed input conduit 11 and surge hopper 12. The conditioning apparatus 10 includes a pressurized housing 14 having a hollow shaft 16 for introducing steam into an interior 20 of the housing 14, and for providing a mechanism for conveying mash feed within the interior 20. The mash feed enters the interior 20 of the pressurized housing 14 through a first rotary air lock 22, which is interposed between the surge hopper 12 and a mash feed inlet 24. The interior 20 of the pressurized housing 14 is maintained at superatmospheric pressures by introducing steam via the hollow shaft 16. Superatmospheric pressure is maintained by the first rotary air lock 22 and a second rotary air lock 26, which is attached to a mash feed outlet 28 and located at the opposite end of the pressurized housing 14 from the mash feed inlet 24. After the mash feed is introduced into the interior 20, it is conditioned by the high pressure steam in the interior 20, which introduces heat and moisture into the feed.

The hollow shaft 16 is preferably mounted coaxially within the interior 20 of the pressurized housing 14. The hollow shaft 16 preferably rotates in a clockwise direction, and includes a conveying mechanism consisting of a plurality of picks or paddle-shaped extensions 84 (See FIGS. 2–4) for conveying mash feed from the input end 30 to the output end 32 of the pressurized housing 14. Accordingly, after mash feed is put into the conditioner 10 via the first rotary air lock 22 and mash feed inlet 24, it is conveyed down the length of the interior 20 of the pressurized housing 14, until it reaches the mash feed outlet 28 and second rotary air lock 26 at the output end 32, where the mash feed passes out of the pressurized interior 20 for further processing by the roller mill 200 and the pellet mill 300 in the preferred process.

High pressure steam is introduced into an internal cavity 74 (See FIGS. 2–4) in the hollow shaft 16 by a steam introduction mechanism including a two-way rotary valve 36. The introduced steam passes from the internal cavity 74 of the hollow shaft 16, into the interior 20 of the pressurized housing 14 through a plurality of spring loaded pressure relief valves 100 (see FIG. 3), where the steam conditions the mash feed as it is conveyed down the length of the interior 20 of the pressurized housing 14 by the conveying mechanism.

The internal cavity 74 of the hollow shaft 16 includes a moisture removal mechanism 120 (See FIGS. 2–3) for removing condensed moisture resulting from the condensation of steam on the walls 76 of the internal cavity 74 of the hollow shaft 16. Such condensed moisture is drawn out of the cavity 74, and removed from the system by way of a moisture extraction pipe 38.

After being steam conditioned, the mash feed passes out of the interior 20 of the pressurized housing 14 by way of the mash feed outlet 28 and second air lock 26 to a first collection bin 42. The sudden pressure drop between the pressurized housing 14 and the unpressurized first collection bin 42 causes the steam conditioned mash feed to liberate excess moisture in the form of "flash-off" steam. The flash-off steam within the first collection bin 42 is drawn away from the mash feed by way of a steam exhaust conduit 44A connected to an exhaust fan 46. Interposed within the steam exhaust conduit 44A is a baffle 48A which facilitates the condensation of excess moisture present in the flash-off steam.

The steam conditioned mash feed next passes from the first collection bin 42 into the roller mill or cracking mechanism 200. Two compression rolls 210,212 located within the rolling mill 200 rotate in opposing (clockwise vs. counterclockwise) directions such that mash feed passing between the compression rolls 210,212 is compressed and cracked. A shear force is created by rotating one of the compression rolls 210 at a slightly faster speed than the other roll 212. When the conditioned mash feed is subjected to the shearing action of the compression rolls 210,212, the feed is cracked and moisture contained within the steam conditioned mash feed is driven into the starch kernels of the feed, resulting in a higher degree of gelatinization of the starch of the cracked mash feed than would otherwise be expected. It will be appreciated that differential roller mills are known in the art and that differential speeds, as used in the present invention, can be achieved by the purchase of a differential roller mill which has opposing rolls which roll at different speeds. In the present invention, it is preferred that the first roll 212 will roll at a speed which is at least 3%, preferably about 5%, more preferably about 10% faster than the speed of the other roll 212. Although the differential between the two rolls may be as great as 25%, it is believed that the faster roll will begin to drive the slower roll at such a differential so that higher differentials are generally believed to be ineffective. It will also be appreciated that it is not critical to the present invention to provide for a differential roller mill mechanism, as described above, and that rolls rotating at the same speed may be used quite effectively. The advantage of providing the shear force by rotating one of the compression rolls at a slightly faster speed, is that it is believed that more moisture will be driven into the mash feed and internalized, thereby removing the moisture from the surface of the feed to reduce the effective moisture level external to the feed, and also to increase the gelatinization of the starch within the feed as a result of driving the moisture, which will carry additional heat, into the feed. It is also noted that the increase in internal moisture content can be expected to further increase the specific heat of the feed, thereby further increasing the feed's capacity for further heat absorption.

The cracked mash feed next passes into a second collection bin 230, wherein additional flash-off steam liberated by the cracking process is drawn off, through a steam exhaust conduit 44B, including an interposed baffle 48B, by the exhaust fan 46. Then, the cracked mash feed passes from the second collection bin 230, into the pellet mill 300, which includes an extrusion die mechanism or a die and roller assembly 320, as further illustrated in FIG. 13. A preferred pellet mill 300 includes the elements of the pellet mills and die and roller assemblies disclosed in U.S. patent application Ser. No. 240,966 filed Sep. 6, 1988, which issued as U.S. Pat. No. 4,983,343, on Jan. 8, 1991, which is included herein by reference, as previously stated hereinabove. Processing of the cracked mash feed through the extrusion die mechanism 320 liberates additional flash-off steam, which is drawn off, through a steam exhaust conduit 44C, including an interposed baffle 48C, by the exhaust fan 46. Finally, the pelleted feed is passed through an opening 350 in a supporting framework 360 which supports the mash feed pelleting system. The pelleted feed is thereafter cooled and packaged for sale or distribution.

Figure 2:
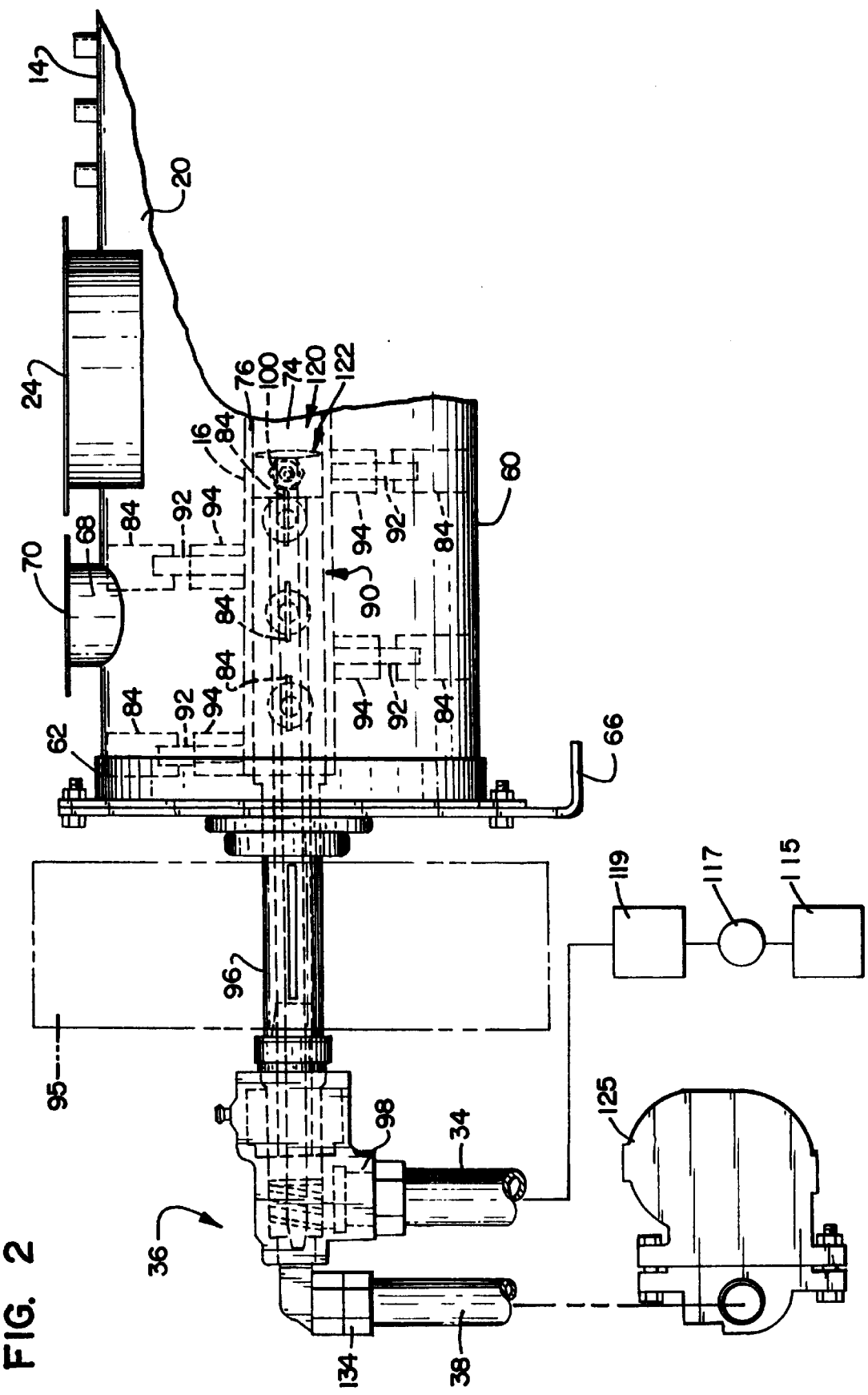
FIG. 2 is a side view of a first end portion of the mash feed conditioning apparatus referenced in FIG. 1.
Figure 3:
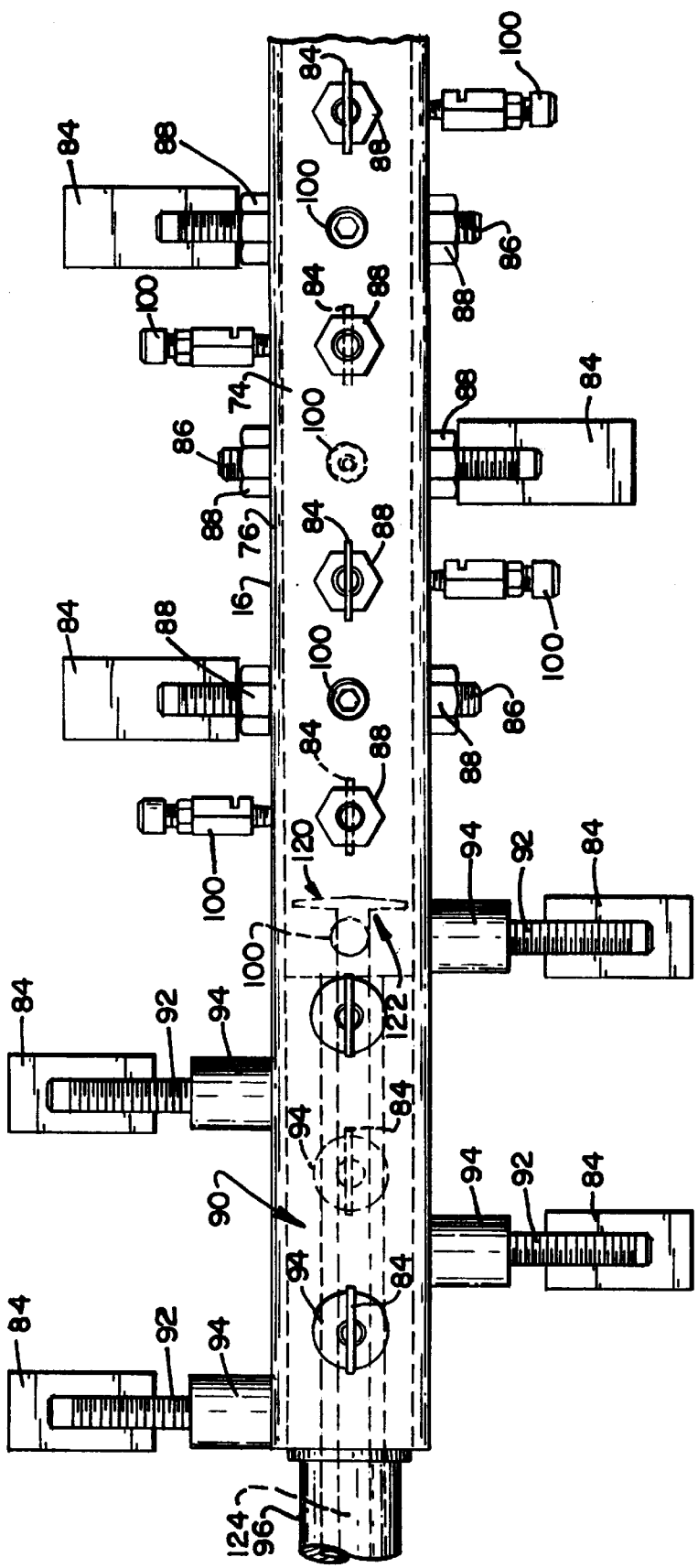
FIG. 3 is an enlarged side view of a portion of a shaft shown in part in phantom in FIG. 2.
Figure 4:
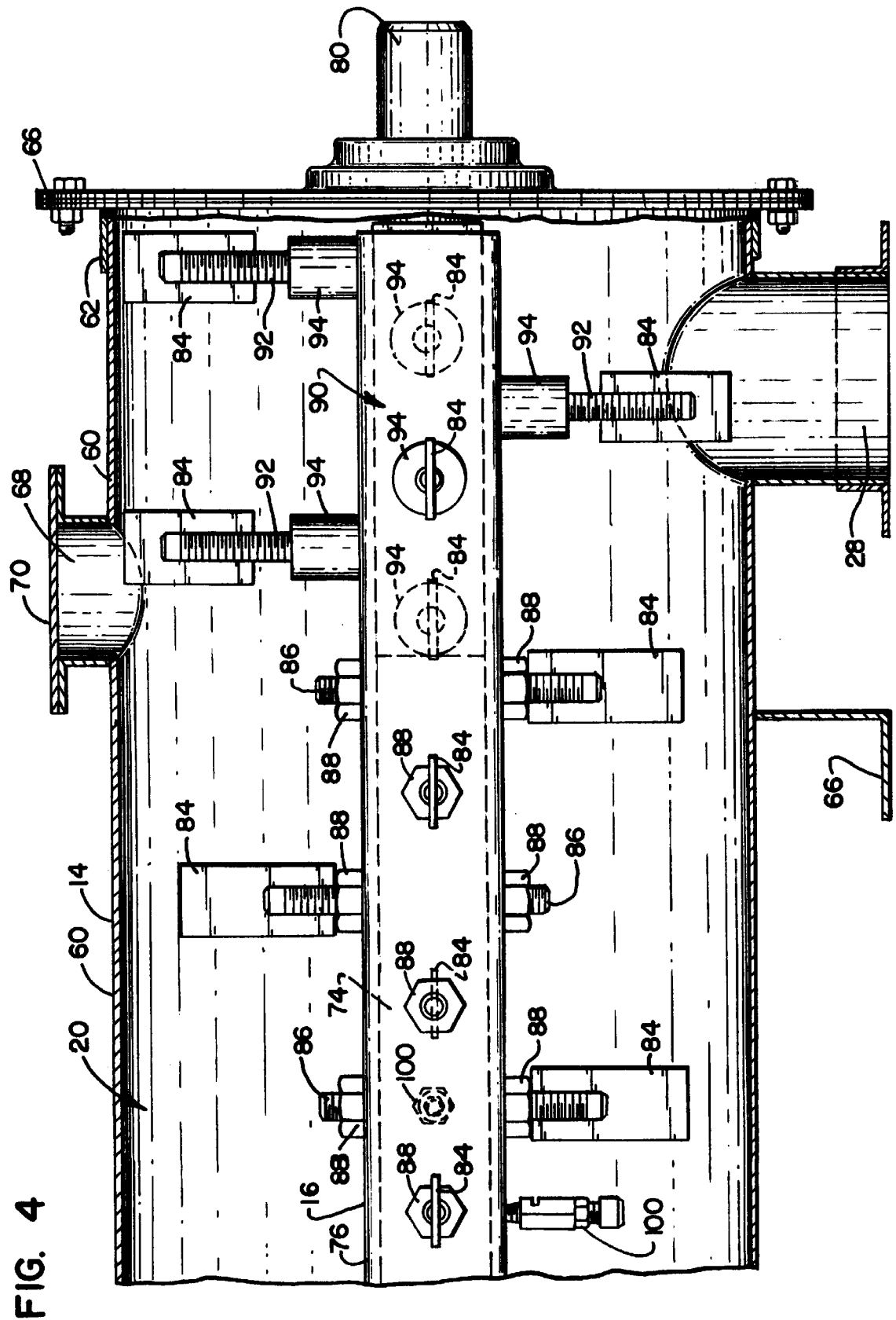
FIG. 4 is an enlarged side cut away view of a second end portion of the mash feed conditioning apparatus referenced in FIG. 1.

Referring now also to FIGS. 2 through 4, the pressurized housing 14 includes an interior 20 defined by housing walls 60 and end plates 62 located at opposing ends of the pressurized housing 14. The pressurized housing 14 is maintained in position with respect to the remaining elements of the mash feed pelleting system 1 by support members 66. The walls of the housing 60 contain several sealable inspection openings 68 having inspection covers 70. The mash feed inlet 24 and mash feed outlet 28 are respectively maintained in sealed communication with the first rotary air lock 22 and second rotary air lock 26 illustrated in FIG. 1. Accordingly, the first and second rotary air locks 22 and 26 function to maintain superatmospheric pressures within the pressurized housing in order to condition mash feed therein. The preferred rotary air locks are Teflon® brand polytetrafluoroethylene coated air locks from MAC Equipment Co., Sabetha, Kans. 66534 (Model No. 12×10, 1½ Hp, 230/460 v, 3 phase motor, 33 rpm).

The hollow shaft 16, including the internal cavity 74 being defined by one or more cavity walls 76, is preferably centered and mounted coaxially within the interior 20 of the pressurized housing 14. As used herein, coaxially mounted denotes the centering of the hollow shaft 16 within the interior 20 of the housing 14, with each end of the shaft 16 being displaced through and centered within the end plates 62 of the housing.

In operation, the hollow shaft 16 is preferably rotated in a clockwise direction by a drive mechanism 95, preferably a typical belt drive mechanism (not shown), interconnected with a drive shaft extension 96 of the hollow shaft 16. The preferred drive speed is 320 rpm. In addition, the hollow shaft 16 includes a conveying mechanism consisting of a series of helically mounted picks or paddle-shaped extensions 84. The paddle-shaped extensions 84 are spaced at regular intervals along the length of the hollow shaft 16, with each paddle-shaped extension 84 being offset an additional 90° from the previously placed extension. While the paddle-shaped extensions 84 of the preferred embodiment are helically arranged along the shaft 16, it will be appreciated that the paddle-shaped extensions 84 could be configured in any manner which would assist in conveying mash feed from the mash feed inlet 24 to the mash feed outlet 28. In addition, it will be further appreciated that any other effective conveying mechanisms, such as an auger arrangement or the like, are also considered to be within the scope of the present invention.

Except for the extensions 84 proximate a moisture removal device 122, which passes through a portion of the cavity 74, each of the paddle-shaped extensions 84 are affixed to the hollow shaft 16 by a longbolt 86 which passes completely through the cavity walls 76 and internal cavity 74 of the hollow shaft 16, and is secured by a nut 88, on each side of the hollow shaft 16. The paddle-shaped extensions 84 which are located proximate to the location of the moisture removal device 122, including a portion 90 of the hollow shaft 16 where the cavity 74 narrows, are attached by securing a shortbolt 92 to a paddle attachment member 94 mounted on the hollow shaft 16. This permits the shaft 16 to rotate while the moisture removal device 122 remains stationary.

Figure 12:
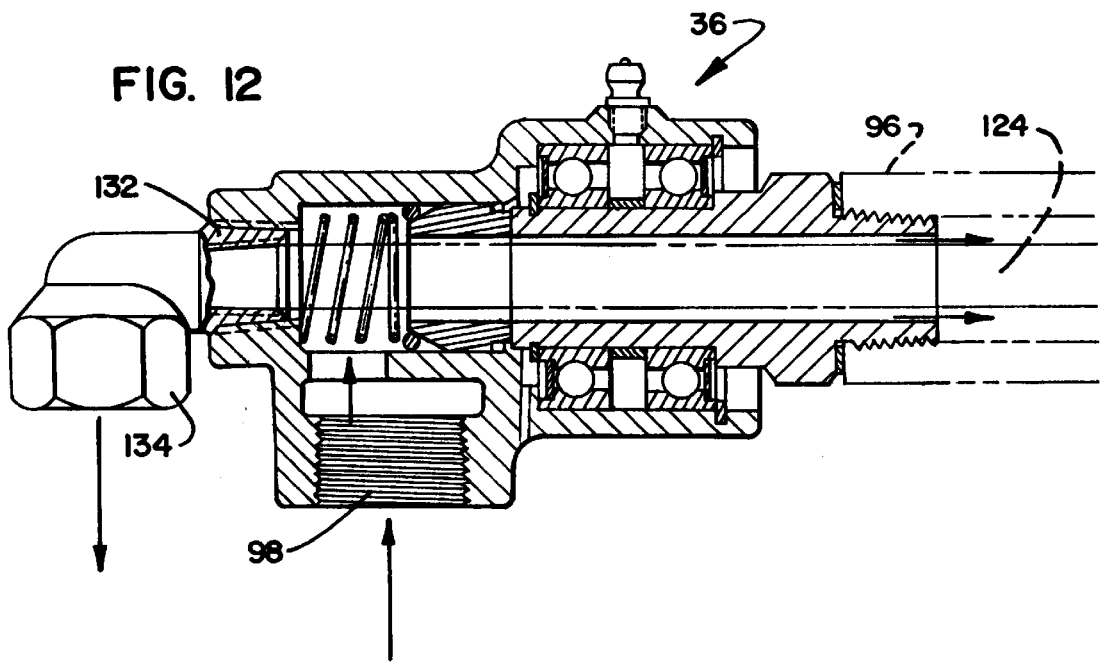
FIG. 12 is an enlarged sectional view of a portion of the first end of the conditioning apparatus shown in FIG. 2 including the portions of the steam introduction mechanism and the moisture removal mechanism.

Referring now also to FIG. 12, the hollow shaft 16 of the preferred embodiment also includes a steam introduction mechanism, including the two-way rotary valve 36 (preferably a BARCO DUO-FLOW™ Rotary Joint (Part No. BC 30010-20-04), from Aeroquip Barco Corp., Jackson, Mich.), including a rotatable shaft extension which is threadably attached to one end of the hollow shaft 16. Preferably, the steam is generated by a boiler 115, such as a water tube boiler, a fire tube boiler, a scotch marine boiler or the like (not shown), and is then transported under pressure to the two-way rotary valve 36 by a steam pipe 34, threadably attached to a steam pipe fitting 98 in the two-way rotary valve 36. Prior to entering the rotary valve 36, the steam passes through a pressure relief valve 117 and a steam pressure regulator 119. Preferably, the steam is introduced into the cavity 74 of the shaft 16 at a pressure of from about 0–120, preferably about 10–90 pounds per square inch (psi) and a temperature of from about 210–350° F., preferably about 239–331° F.

Once introduced into the internal cavity 74, the steam passes through the cavity walls 76, and into the interior 20 of the pressurized housing 14 by way of a series of spring-loaded pressure relief valves 100. Preferably the pressure relief valves 100 are configured to release steam at a pressure preferably above about 5 psi, preferably a pressure of about 5–120 psi, more preferably a pressure of about 10–25 psi. It will be appreciated that the valves 100 could be configured to release steam into the interior 20 at any pressure desired by the operator of the mash feed conditioning system 1. Accordingly, when steam under the preferred pressure of from about 50–120, preferably about 10–90 psi, is introduced into the internal cavity 74 of the hollow shaft 16, the pressure relief valves 100 remain open, and releases a constant source of high pressure steam into the interior 20 of the pressurized housing 14 for conditioning mash feed contained therein.

It will be appreciated that any mechanism for maintaining the pressure of the steam in the internal cavity 74 of the hollow shaft 16 can be used and that this mechanism, preferably a series of pressure relief valves 100, is necessary to permit the pressure within the interior of the housing to be increased so that the pressure drop between the steam generation mechanism (not shown) and the interior 20 via the internal cavity 74 of the shaft 16 can be either eliminated or minimized during operation of the conditioning apparatus 10. It will be appreciated that if the steam pressure in the shaft cavity 74 and the interior 20 of the housing 14 can be maintained at a high level similar to or the same as the pressure of the steam supplied to the shaft 16, the loss of heat and the moisture condensation in the shaft 16 and the interior 20 of the housing 14 will be minimized.

One skilled in the art would also appreciate that it is not possible to simply open up a steam supply valve fed into a prior art mash feed conditioner because of the significant pressure drop which would result in significant moisture condensation within the prior art housing. Furthermore, it is believed that even if the pressure drop were not significant, the front end feed in the prior art conditioner at the time of input would not be able to absorb all of the heat delivered. One reason for the inability of the feed to absorb the sudden input of heat, is believed to be that the internal or bound moisture within the feed would generally be too low to permit a rapid transfer of heat into the mash feed. This is believed to be because the specific heat of the mash feed at lower internal moisture levels is considerably lower than it would be when the internal moisture levels in the feed is increased.

The present Applicant has discovered that it is possible to gradually increase the internal moisture level of the mash feed by introducing steam at relatively high pressures using a series of air relief valves 100 distributed over the length of the shaft 16 which runs throughout the length of the housing 14. It is believed that it is important to have a relatively large number of relief valves or nozzles 100 so that the steam release into the interior 20 of the housing 14 can be distributed over a large area. In preferred embodiments, the shaft will have 26 pressure relief valves 100. Eight of these will be set to open at a steam pressure of 10 psi, another eight will be set to open at 15 psi, and another eight will be set to open at 25 psi. As the steam pressure in the cavity 74 of the shaft 16 is gradually increased from 10 psi during operation of the conditioning apparatus 10, the various pressure relief valves 100 will gradually open further and further until they are fully opened and a constant source of steam is introduced into the interior 20 of the housing from the cavity 74 of the shaft.

The object of the use of a pressure relief mechanism or pressure relief valves 100 is to maintain shaft pressure and consequently higher steam pressure which is capable of carrying and delivering higher levels of heat energy for conditioning mash feed. The pressure relief valves 100 allow the shaft pressure to be increased slowly during mash feed conditioning until the valves 100 are fully opened and high pressure steam is passing directly into the interior 20 of the housing 14 via the shaft cavity 74 without a significant pressure drop which would result in a loss of heat and significant moisture condensation. Once the conditioner 10 is operating, and the relief valves 100 are fully opened, the pressure in the shaft 16 and the interior 20 of the housing 14 can be significantly increased, so that the pressure reaches levels as great as 40, 60, 75, 90 psi or even greater so long as such pressures can be maintained within the housing 14, the shaft 16 and the steam delivery mechanism (not shown) generally.

It is also worth noting that significant importance is accorded to the relative location of the respective pressure relief valves 100. It is preferred that the series of 10 psi relief valves, 15 psi relief valves and 25 psi relief valves be helically arranged in series around the shaft so that they lag behind one another separated by a 90° angle. It will also be appreciated that the nozzles 100 will preferably trail the picks 84 or preferably lag 90° behind the picks 84 in reference to the rotation, which is preferably clockwise as viewed from the tail shaft 80. This is important because once the pick 84 passes through the mash feed, the mash feed is "fluffed up" or more loosely distributed within the housing so that the steam which is released from the pressure relief valve 100 which follows the pick will be able to distribute the steam more evenly or, arguably, more efficiently to the mash feed proximate any particular point along the shaft.

To further elaborate on the release of steam into the interior 20 via the pressure relief valves 100, it will be appreciated that an effective "setup" or spring compression arrangement of the relief valves will allow for proper steam introduction at variable feed rates the preferred "setup" is to group the valves in three groups with different relief pressures. The preferred pressures are 10, 15 and 25 psi. This will provide variable orifice opening areas of preferably 0.0379, 0.0763, and 0.1159 square inches respectively. Preferably, each of the pressure relief valves will be fully opened and achieve a maximum orifice opening at about 35 psi. The nozzles are preferably placed on the shaft such that the pressure sequence is 10, 15, 25, 10, 15, 25 . . . etc., starting at the input end of the conditioner 10. It is possible to supply the total pounds of steam required for conditioning operations at a feed flow rate of 2,000 pounds per hour using only nine nozzles 100. However, at 36,000 pounds of mash feed per hour, it is believed that 26 nozzles are preferred at a housing pressure of 20 psi and may be required for a feed flow rate of 72,000 pounds per hour at 25 psi. As can be appreciated, it is important for a nozzle 100 to possess the ability to change its orifice size from a very small opening to a full opening when a conditioning apparatus 10 is brought up to full capacity to feed a pellet mill 300 operating at full capacity. After the orifice is fully opened, additional steam can be obtained by increasing the steam pressure in the supply line.

Referring now also to FIG. 5, which illustrates a cross-sectional side view of a preferred spring-loaded pressure relief valve 100, the pressure relief valve 100 includes a pin 103, a tensioning spring 112, and a hollow body member 102, including an inner chamber 104 defined by one or more chamber walls 106. The hollow body member 102 is closed at one end by a pressure cap 108 which is threadably secured to the remainder of the body member 102. The tensioning spring 112 is mounted within the hollow body member 102, and a steam opening 114 passes through the chamber wall 106. The spring 112 biases the pin 103 toward a pressure seat 110B of the body member, thereby limiting the passage of steam when the pressure of the steam is insufficient to move the pin 103 away from the seat 110B. When the pressure is not great enough to overcome, or neutralize, the force of the spring 112 biasing the pin 103 toward the seat 110B, the pin 103 is pressed against the seat 112 and the steam is unable to pass through the valve 100 into the interior 20. The pressure relief valve 100 is disposed through and mounted within the cavity walls 76 of the hollow shaft 16 by a threadable extension member 116 including a central bore 118 running therethrough.

In operation, when pressurized steam introduced into the internal cavity 74 of the hollow shaft 16 exceeds the tensioning force of the tensioning spring 112, pressurized steam passing into the central bore 118 overcomes the resistance in the tensioning spring 112 and urges the pin 103 upward, away from the seat 110B, such that pressurized steam can pass from the internal cavity 74, through the central bore 118, through a central opening 110A in the seat 110B, out of the steam opening 114 and into the interior 20 of the pressurized housing 14. Thus, a constant source of pressurized steam is supplied to the interior 20 of the pressurized housing 14 for conditioning mash feed contained therein when the steam pressure exceeds the force of the spring 112. In the preferred embodiments the springs 112 are set to open at a steam pressure of 20 psi.

Referring now also to FIGS. 6 through 7 and 12, the hollow shaft 16 according to the preferred embodiment of the present invention also includes a moisture removal mechanism 120, including the two-way rotary valve 36 and a moisture extraction pipe 38 connected to an external steam trap 125, for removing condensed moisture resulting from the condensation of steam within the internal cavity 74 of the hollow shaft 16. As used herein, condensed moisture refers to moisture in a liquid state, being mostly water, resulting from the condensation of steam upon the cavity walls 76 and elsewhere. The condensed moisture 136 will pass out of the cavity 74 under the pressure of the steam in the shaft 16. When it reaches the steam trap 125, the condensed moisture 136 is allowed to pass out of the moisture removal mechanism 120, but the steam pressure is maintained by preventing steam from passing through the steam trap 125.

When pressurized steam is introduced into the internal cavity 74 of the hollow shaft 16 by the steam introduction mechanism it contacts the cavity walls 76, and transfers a substantial portion of latent heat to the cavity walls 76 of the hollow shaft 16. The loss of latent heat transforms a portion of the moisture in the steam from a gaseous to a liquid state, thereby condensing on the cavity walls 76. It is this condensed moisture 136 which is removed via the moisture removal mechanism 120 of the present invention.

Referring now particularly to FIGS. 6 and 7, which illustrate a portion of the preferred embodiment of the moisture removal mechanism 120 according to the present invention, the moisture removal mechanism 120 includes the walls 76 of the cavity 74 of the shaft 16 and a hollow moisture removal device 122 consisting of a siphon conduit 124 connected to a siphon head 126 mounted within the cavity 74 of the shaft 16. The siphon head 126 includes several siphoning openings 128 for drawing condensed moisture 136, or allowing condensed moisture to pass, out of the internal cavity 74 of the hollow shaft 16 as the shaft 16 rotates. The condensed moisture 136 then passes through the siphon conduit 124, then through the moisture extraction pipe 38, to the external steam trap 125, preferably a thermal dynamic steam trap such as an FT 10-C Ball Float Steam Trap with thermostatic air vent assembly and steam lock release assembly (from Spirax Sarco, Inc., Allentown, Pa.), or the like.

FIG. 7 shows a cross-sectional view through the siphon head 126 of the moisture removal mechanism 120 and the surrounding cavity walls 76 of the hollow shaft 16 at reference line 130 of FIG. 6. In the embodiment shown, the hollow shaft 16 is substantially square in cross section, the square cross-section being formed by the conjunction of the adjacent cavity walls 76 to form cavity corners 131.

Referring now also to FIGS. 2 through 3 and 12, the siphon conduit 124 of the moisture removal mechanism 120 extends from its connection with the siphon head 126, mounted within the internal cavity 74 of the hollow shaft 16, through the shaft extension 96 and into the two-way valve 36, where the siphon conduit 124 is threadably engaged with a siphon fitting 132 located in one end of the two-way valve 36. A moisture pipe fitting 134, mounted proximate the siphon fitting 132 provides for fluid communication between the siphon conduit 124 and moisture extraction pipe 38, such that condensed moisture can be removed from the internal cavity 74 of the shaft 16 by the external steam trap 125.

Referring now again to FIG. 7, during operation, the clockwise rotational movement of the hollow shaft 16 creates centrifugal forces which urge moisture 136, which has condensed upon the cavity walls 76, into the corners 131 of the substantially square hollow shaft 16 when the hollow shaft 16 rotates at a rate sufficient to move a drop of the condensed water along a smooth surface of the cavity walls 76 which are angled away from the longitudinal axis or center of the hollow shaft 16. Once the condensed moisture 136 has been urged to the corners 131, the backpressure resulting from the passage of condensed moisture to the exclusion of steam through the steam trap 125 draws or allows the moisture to pass into the siphon openings 128 of the siphon head 126, and thereafter through the hollow center of the siphon conduit 124, and then the moisture extraction pipe 38 to the external steam trap. Thus, the constant backpressure which results from the presence of the external steam trap continually permits condensed moisture to pass from the corners 131 of the hollow shaft 16, along the length of the shaft 16, towards the siphon head 126, where the moisture is drawn out or allowed to pass out of the internal cavity 74 of the hollow shaft 16 as described above.

Referring now also to FIGS. 8 through 11 which illustrate alternative moisture removal mechanisms 140, 140' and 140". In contrast to the moisture removal mechanism 120 depicted in FIGS. 6 and 7, the first alternative moisture removal mechanism 140 is mounted within and forms a part of the tail shaft extension 80 of the hollow shaft 16' of the first alternate embodiment of the present invention. In particular, a tail shaft insert 142 is affixed to, such as through welding points 144, and within the tail shaft end 143 of the hollow shaft 16'. In a preferred aspect, the tail shaft insert 142 has a central void 146 running from the tail shaft end 143 of the insert 142 to, but not through, the inner end 148 of the insert 142 enclosed within the cavity 74' of the hollow shaft 16'. Tube conduits 150, in communication with the central void 146, each containing a moisture tube 152 therein, are positioned such that the moisture tubes 152 are directed into the corners 131' of the internal cavity 74'. Thus, in a somewhat analogous fashion to the moisture removal mechanism 120 depicted in FIGS. 6 and 7, condensed moisture from steam introduced into the internal cavity 74' of the hollow shaft 16' is urged into the corners 131' of the cavity walls 76' as the shaft 16' rotates. However, in this case the moisture removal device 142 is secured to and rotates with the shaft 16'. Instead of the two-way rotary valve 36 shown in FIGS. 2 and 12, the shaft 16' is interconnected with a one-way rotary valve (not shown) also available from Aeroquip Barco Corp. and to another similar one-way rotary valve (not shown) at the other end. Preferably, the drive shaft (not shown) is interconnected with a first MONO-FLOW™ Rotary Joint (Part No. BC 30002-20-04 from Aeroquip Barco Corp.) (not shown) and the tail shaft end 143 is interconnected with a second MONO-FLOW™ Rotary Joint (Part No. 30003-08-04 from Aeroquip Barco Corp.) (not shown) such that steam can flow into the internal cavity 74' via the first rotary valve (not shown) and condensed water (not shown) can pass out of the internal cavity 74' via the central void 146, which communicates with a passageway (not shown) in the second rotary valve (not shown), through the second rotary valve (not shown) to an external steam trap (not shown) similar to that described hereinabove. As the shaft 16' rotates, the removal device 142 rotates with the shaft 16' allowing the condensed moisture, which is urged to the corners 131' by the centrifugal force of rotation, to pass through the tubes 152 and the conduits 150, through the central void 146, through the one-way rotary valve (not shown) and into an alternate extraction pipe (not shown) connected to a steam trap (not shown) similar to and in a manner equivalent to that described above in respect to the preferred embodiment.

Figure 9:
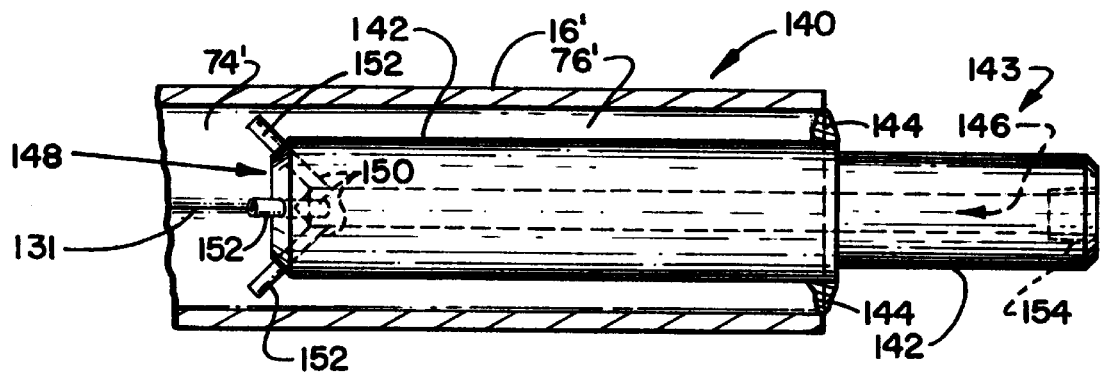
FIG. 9 is a sectional view of the alternate moisture removal mechanism shown in FIG. 8 as viewed from line 9—9 of FIG. 8.
Figure 8:
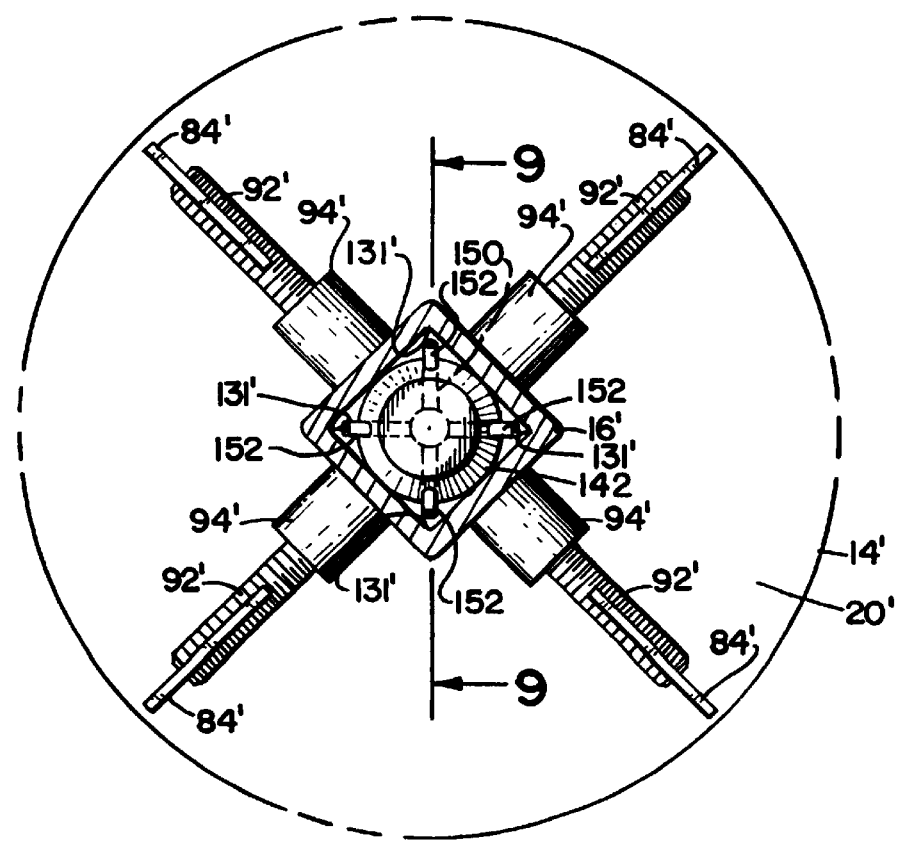
FIG. 8 is an end view of an alternate moisture removal mechanism in accordance with the present invention.

As depicted in FIG. 8, the hollow shaft 16' according to the first alternate embodiment has a substantially square axial cross-section, such that four moisture tubes 152 extract the condensed moisture (not shown) from the corners 131' therein while the shaft 16' rotates. However, referring now also to FIGS. 10 and 11, the hollow shaft may have any polygonal axial cross-section, including but not limited to triangular and hexagonal shafts 16" and 16'" respectively, which provide corners 131" and 131'" from which condensed moisture (not shown) can be withdrawn by the moisture tubes 152' and 152". As shown in FIG. 9, since the tail shaft inserts 142, 142' and 142", negate the use of long bolts 86 to attach the paddle-shaped extensions 84 to the shafts 16', 16" and 16'" the paddle attachment members 94 and short bolts 92 are utilized to attach the paddle-shaped extensions 84 to the shafts 16', 16" and 16'", such that they can rotate therewith, and thereby convey mash feed within the interior of the pressurized housing.

Figure 14:
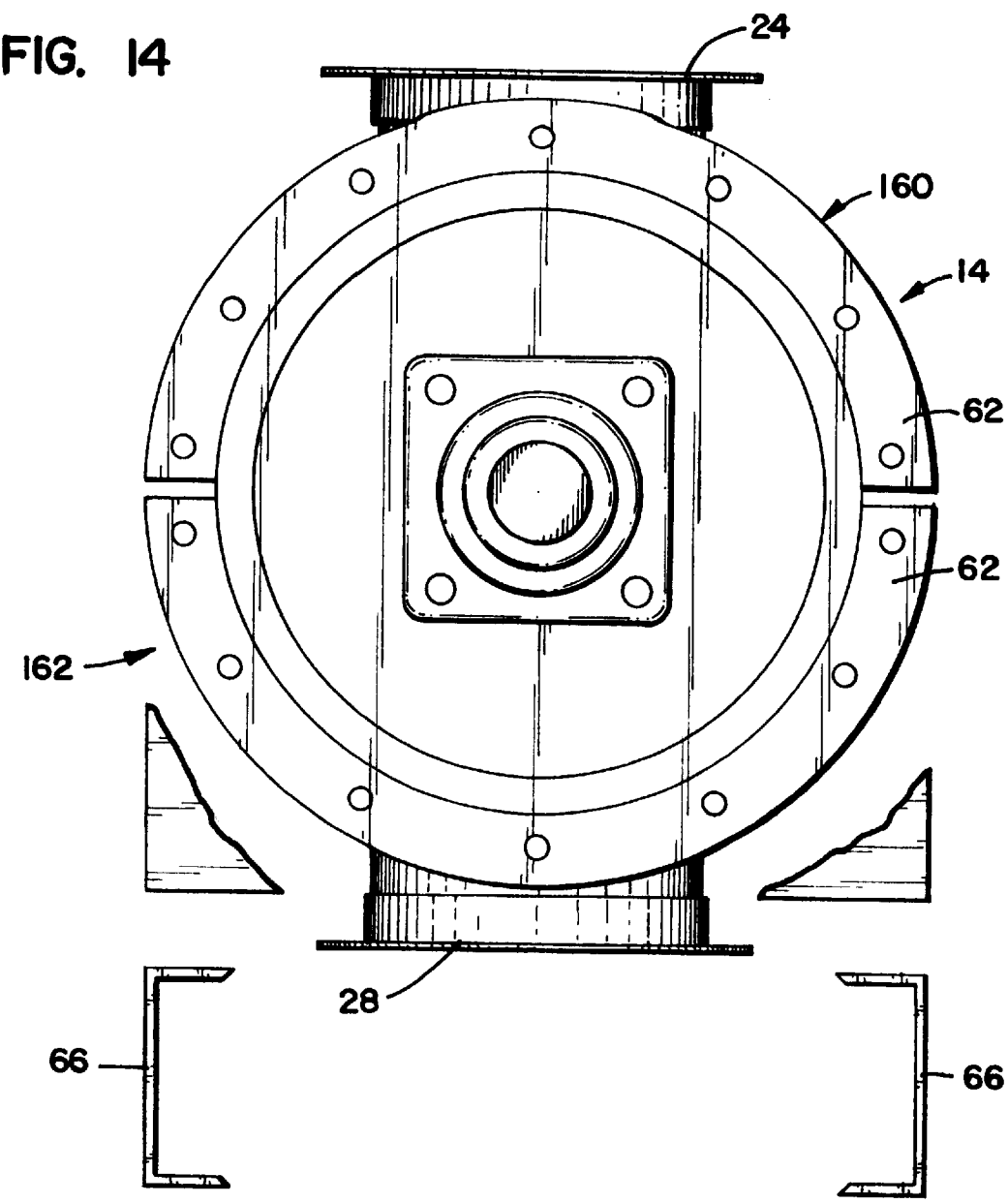
FIG. 14 is an end view of the second end of the housing of the mash feed conditioning apparatus referenced in FIG. 1.
Figure 10:
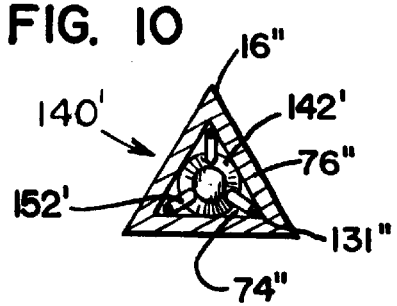
FIG. 10 is an end view of an alternate shaft and another alternate moisture removal mechanism similar to the view shown in FIG. 8; invention.
Figure 11:
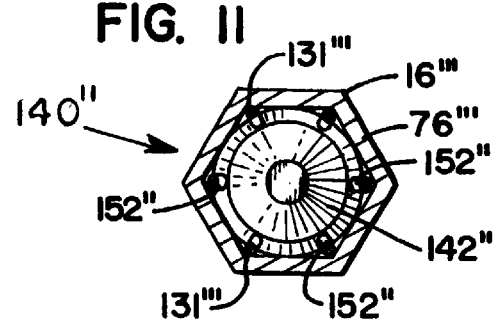
FIG. 11 is an end view similar to that of FIG. 10 of yet another alternate moisture removal mechanism mounted within another alternate shaft.
Figure 15:
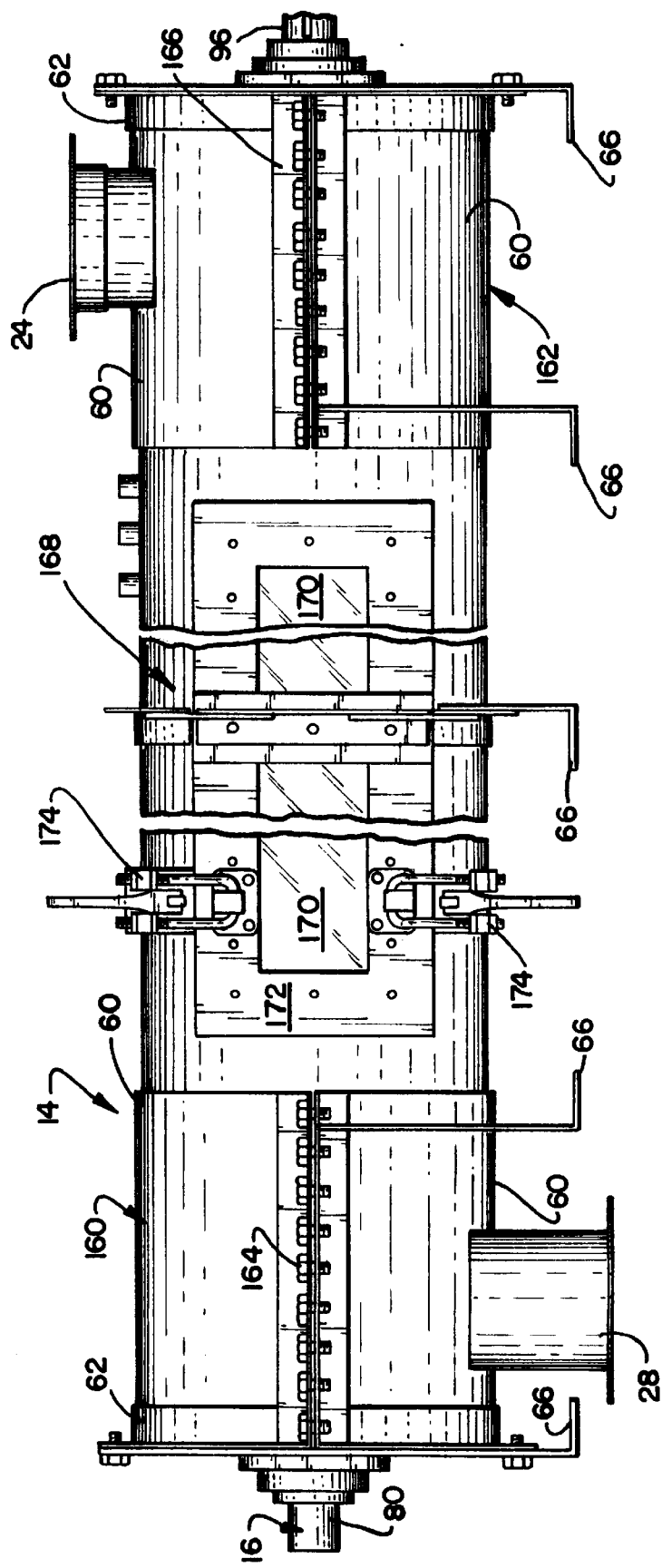
FIG. 15 is a lateral view of the opposite side of the housing of the mash feed conditioning apparatus reference in FIG. 1 showing a maintenance door 168 for access to the interior 20 of the housing 14.

Referring now also to FIGS. 14 and 15, which illustrate the preferred embodiment of a pressurized housing 14 of a mash feed conditioning apparatus 10 according to the present invention, the housing 14 includes a top portion 160 connected to a bottom portion 162 by a plurality of housing bolts 164. In a preferred aspect, the majority of the walls 60 of the housing 14 are composed of an insulating material which exhibits a specific heat of preferably from about 0.3 to 0.8 calories per gram per degree of Centigrade change, preferably a plastic insulating material, while the end plates 62, support members 66, mash feed inlet 24, mash feed outlet 28 and connecting flanges 166 are composed of metal, such as sheet metal comprising steel, stainless steel, or the like. Preferred plastic insulating materials from which the housing walls 60 or portions thereof can be formed include UHMW (ultra high molecular weight) polyethylene, CPVC (chlorinated polyvinyl chloride) and PVDF (polyvinylidene fluoride), and the like, with UHMW polyethylene being particularly preferred for cost efficiency reasons. It will also be appreciated that the housing 14 according to the present invention may be formed of any material which is capable of sustaining the superatmospheric pressures and temperatures generated therein.

The pressurized housing 14 according to the present invention further includes a maintenance door 168 on one side of the housing 14 midway between the top 160 and bottom 162 portions thereof. The body 170 of the maintenance door 168 is also composed of plastic insulating material surrounded by a metal cover plate 172, the maintenance door 168 is maintained in buckled attachment with the housing during operation of the apparatus 10 by a plurality of buckles 174. Thus, the maintenance door 168 may be opened as need be by an operator of the mash feed conditioning apparatus 10 according to the present invention, such as for inspection, cleaning and repair purposes. In addition to the presently described features, the pressurized housing 14 according to the present invention includes all previously described elements, such as the hollow shaft 16, including the tail shaft extension 80, which is mounted coaxially within the interior of the housing 14.

Referring now again to FIG. 1, after being steam conditioned with heat and moisture within the pressurized housing 14 of the mash feed conditioning apparatus 10 according to the present invention, the conditioned mash feed passes out of the conditioning apparatus 10, into the first collection bin 42, and thereafter, through the roller mill 200 in accordance with the present invention. As previously noted, the roller mill 200 consists of two compression rolls 210,212 mounted within a roller mill housing 214. The two compression rolls 210,212 are mounted such that at their closest point their compression surfaces 216 are from about 0.5 to 0.2, preferably about 0.1 inch apart.

During operation, one of the compression rolls 210 is rotated in a clockwise direction and at a faster rate than the other compression roll 212, which rotates in a counterclockwise direction. The rolls 210 or 212 which rotate at the faster rate can rotate from about 2 to 25 percent (%), preferably from about 5–20%, faster than the rate at which the other of the two rolls 210 or 212 rotates. Ideally, the difference between the rate of rotation between the two compression rolls 210,212 should be the difference between about 220 to 200 or a difference of about 10%. The rolls are preferably rotated at about 222 rpm for a roller mill 200 having 10" diameter rolls 210,212 20 inches long with a 0.183 inch gap between the rolls 210,212 and a 36,000 pounds of conditioned mash feed per hour feed rate. It will be appreciated, however, that the speed of the roller mill may be adjusted along with the size of the gap between the rolls so that the feed throughput may be varied. Utilization of these differentially rotated compression rolls 210,212 results in a shearing force being exerted on mash feed passing through the compression rolls 210,212. Application of a shearing force to the hot and moist conditioned mash feed cracks the feed particles and drives much of the moisture into the starch kernels of the mash feed, resulting in a high degree of gelatinization of the starch granules within the mash feed.

To obtain the full benefit of the roller mill 200, it is believed that there is a minimum volume of feed required to force the feed to be compressed into a compressed state as it enters the "pinch-point" between the respective opposing rolls 210,212. If the rolls 210,212 are turning too fast and the gap between the rolls 210,212 is too wide, there will be no compression. Preferred roller mills 200 are equipped with a position sensor (not shown) preferably a Honeywell Micro Switch, Model 941-C2T-2D-21CO) preferably located on a 1¼ inch pipe nipple (not shown) located above the "pinch-point" of the roller mill. The function of this analog position switch, in conjunction with a variable frequency motor drive (not shown) which will drive the motor (not shown) at various speeds, dependent upon an analog input signal, is to control the speed of the respective rollers 210,212 such that there is a specific amount of feed maintained above the "pinch-point" between the respective rollers 210,212. This control method assures that there will be a consistent compression of the conditioned mash feed as it approaches and enters the "pinch-point". As noted above, a roller mill 200 utilizing 10 inch diameter by 20 inch long rollers will rotate at about 222 rpm and 25 rpm for feed rates of 36,000 and 2,000 pounds per hour, respectively.

Figure 13:
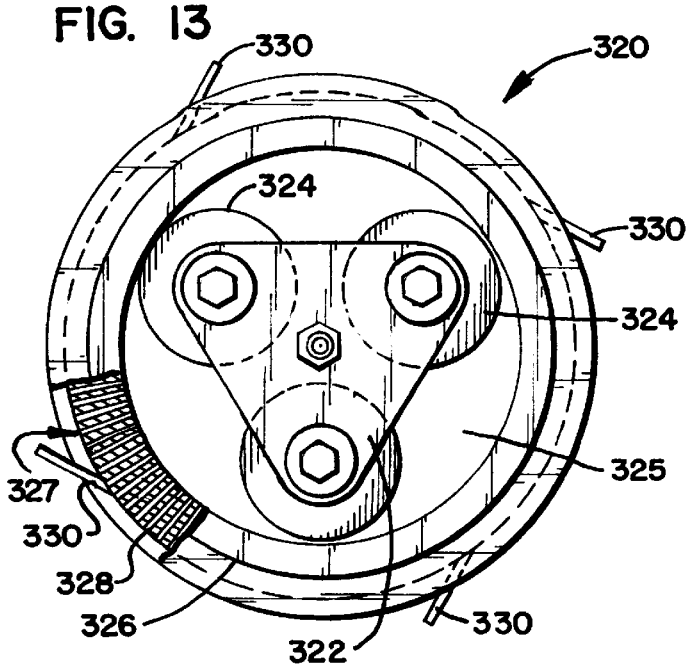
FIG. 13 is a schematic illustration of die and roller assembly or mechanism of the pellet mill referenced in FIG. 1.

Referring also now to FIG. 13 wherein is illustrated an extrusion die mechanism 320 of a mash feed pelleting system 1 according to the present invention. After being subjected to the shearing force of the compression rolls 210,212 of the cracking mechanism 200 of the present invention, the cracked mash feed passes through the second collection bin 230 and into the pellet mill 300, including the extrusion die mechanism 320. The extrusion die mechanism 320 includes a roller assembly 322, having two or more pressure rollers or roll shells 324 mounted thereto. The roller assembly 322 is rotationally mounted within an inner chamber 325 of a circular extrusion die 326, the extrusion die 326 further including an outer surface 327 and a plurality of die openings or extrusion passages 328 through which the mash feed is extruded to form pellets. A series of cutting members 330 mounted proximate the outer surface 327 of the extrusion die 326 periodically sever the mash feed being extruded through the die openings 328 into feed pellets of an approximate predetermined length depending on the rate of mash feed fed to the pellet mill 300.

During operation, cracked mash feed passing into the inner chamber 325 of the extrusion die 326 is contacted by the rotationally driven pressure rollers 324 of the roller assembly 322 and forced through the die openings 328 of the extrusion die 326. Upon being forced through the die channels 328, the mash feed is compressed, and through liberation of excess heat and moisture, hardens into a pellet form which is cut to form pellets by the cutting members 330 located proximate the outer surface 327 of the extrusion die 326.

It is to be understood that even though numerous characteristics and advantages of various embodiments of the present invention have been set forth in the foregoing description, together with details of the structure and function of various embodiments of the invention, this disclosure is illustrative only an changes may be made in detail, especially in matters of shape, size and arrangement of parts, within the principles of the present invention, to the full extent indicated by the broad general meaning of the terms in which the appended claims are expressed.

What is claimed is:

1. A mash feed conditioner, comprising:

(a) a housing having an interior to receive mash feed to be conditioned therein, said housing having first and second ends, said housing further including feed inlet means at said first end and feed outlet means at said second end;

(b) shaft means extending through at least a portion of said interior, away from the first end in the direction of the second end, said shaft means having an outer wall, said shaft means further including an interior cavity at least partially defined by an inner surface of said outer wall, said cavity being of a generally polygonal axial cross-section and having a plurality of corners at the union of sides of the polygonal shape, wherein the polygonal cross-section configuration is effective to urge liquid condensing upon the inner surface of said outer wall to run toward respective corners of any of a continuum of axial cross sections when the shaft rotates at a rate of speed sufficient to create centrifugal forces sufficient to move a drop of water along a smooth surface angled away from a center of said shaft, said shaft means further including steam outlet means for allowing steam to pass out of said cavity, across said outer wall, and into said interior;

(c) introduction means for introducing steam into said cavity wherein mash feed in said interior can be conditioned by steam introduced into said cavity of said shaft and passed across said outer wall into said interior via said steam outlet means, said steam introduction means further including means for removing condensed moisture from said cavity, and a source of steam connected to said cavity by a steam regulator, wherein steam in said cavity can be maintained at pressure from about 40–90 pounds per square inch and wherein steam in said interior of said housing can be maintained at superatmospheric pressures; and (d) rotation means for rotating said shaft means further including conveying means for conveying said mash feed said first end to said second end during rotation of said shaft means.

2. A steam introduction shaft for introducing steam into an enclosure, the steam introduction shaft comprising:

(a) a partially hollow elongated member having interior wall means defining a cavity, said interior wall means including a plurality of adjacent sides each being joined together to form corners at respective intersections of said adjacent sides, and wherein moisture condensed upon the interior wall means is biased toward the corners during rotational movement of the elongated member, said elongated member further including a plurality of corner conduits each extending toward a corner to withdraw condensed moisture therefrom, said elongated member further including steam outlet means in communication with the cavity for releasing steam into the enclosure;

(b) means for rotating said elongated member;

(c) steam introduction means in communication with the cavity; and (d) moisture removal means defined by said corner conduits in communication with the cavity for removing condensed moisture therefrom.

3. A mash feed conditioning apparatus, comprising:

(a) housing means having an interior for receiving mash feed to be conditioned therein, wherein said housing means include housing inlet means for introducing mash feed into said interior and housing outlet means for passing mash feed out of the interior;

(b) a shaft mounted within said housing means and extending through said interior, said shaft having an internal cavity being defined by one or more cavity walls and said cavity having a polygonal axial cross-section, the axial cross-section being effective to urge moisture condensing upon said cavity walls to run toward respective cross-sectional corners of the polygonal axial cross-section when said shaft rotates at a rate of speed sufficient to create a centrifugal force sufficient to move a drop of condensed moisture along a smooth surface angled away from a center of said shaft, said shaft further including conveying means for conveying mash feed through the interior upon rotation of said shaft;

(c) moisture removal means for removing said condensed moisture from said cavity wherein said moisture removal means include a conduit for said moisture passing out of said cavity;

(d) rotation means for rotationally driving the shaft within said interior, wherein mash feed can be conveyed from said housing inlet means in a direction toward said housing outlet means by the conveying means and the rotational movement of said shaft; and (e) steam introduction means in communication with said cavity for introducing steam into said cavity in said shaft, said shaft further including steam outlet means in communication with said cavity and with said interior for permitting steam to pass from said cavity into said interior, wherein steam can enter said interior via said steam outlet means such that mash feed can be conditioned in said interior.

4. The mash feed conditioning apparatus of claim 3 wherein said conduit includes a moisture removal head mounted proximate one end of said conduit, the moisture removal head being configured to remove moisture urged to the respective cross-sectional corners of said cavity.

5. The mash feed conditioning apparatus of claim 3 wherein said moisture removal means includes a tail shaft insert integrally mounted within one end of said shaft.

6. The mash feed conditioning apparatus of claim 5 wherein said tail shaft insert includes a central void, said moisture removal means including a plurality of tube conduits in communication with said central void, each tube conduit having a moisture removal tube therein, the moisture removal tubes being configured to remove moisture urged to the respective cross-sectional corners of the cavity.

7. A mash feed conditioning apparatus for operational use in conditioning mash feed prior to introduction into a pellet mill, said apparatus comprising:

(a) housing means for receiving mash feed to be conditioned therein, said housing means including an interior defined by one or more housing walls and first and second ends, and housing pressure containment means for maintaining superatmospheric pressure within said interior, said pressure containment means including housing inlet means including a first air lock for introducing mash feed into said interior and housing outlet means including a second air lock for passing mash feed out of said interior;

(b) conveying means for conveying mash feed through said interior, said conveying means including a shaft mounted within said housing means and extending through said interior, away from said first end and in direction of said second end, said shaft having an internal cavity having a polygonal cross-section, said polygonal axial cross-section being effective to urge moisture condensing upon said one or more cavity walls to run toward respective cross-sectional corners of the polygonal axial cross-section when said shaft rotates at a rate of speed sufficient to create centrifugal forces sufficient to move a drop of water along a smooth surface angled away from a center of said shaft;

(c) steam introduction means in communication with said cavity for introducing steam into said cavity in said shaft, said shaft further including a plurality of pressure relief valves in communication with the cavity and with said interior for permitting steam under superatmospheric pressure to pass from said cavity into said interior, wherein steam can enter said interior via said pressure relief valves such that mash feed can be conditioned thereby in said interior; and (d) moisture removal means for removing condensed moisture from said cavity.

8. The mash feed conditioning apparatus of claim 7 wherein the moisture removal means includes a conduit for removing condensed moisture from said cavity.

9. The mash feed conditioning apparatus of claim 8 wherein said moisture removal means further includes a moisture removal head and wherein said conduit is interconnected with said moisture removal head mounted proximate an end of said conduit, said moisture removal head being configured to remove moisture urged to the cross-sectional corners of said cavity.

10. The mash feed conditioning apparatus of claim 9 wherein said moisture removal head includes a plurality of moisture removal tubes in communication with said conduit, the tubes being configured to remove moisture urged to the corners of said cavity.

* * * * *